United States Patent [19]
Relyea et al.

[11] Patent Number: 5,930,344
[45] Date of Patent: Jul. 27, 1999

[54] METHOD AND APPARATUS FOR TRACING A SPECIFIC COMMUNICATION

[75] Inventors: Wayne E. Relyea, Middletown; Edward Nicholas Shipley, Holmdel, both of N.J.

[73] Assignee: AT & T Corp., Middletown, N.J.

[21] Appl. No.: 08/949,488

[22] Filed: Oct. 14, 1997

[51] Int. Cl.⁶ .................................................. H04M 15/00
[52] U.S. Cl. ..................... 379/126; 379/127; 379/112; 379/246; 379/247
[58] Field of Search ............................. 379/34, 126, 133, 379/114, 113, 247, 265, 266, 111, 201, 1, 27, 26, 29, 127, 115, 112, 246

[56] References Cited

U.S. PATENT DOCUMENTS

| | | |
|---|---|---|
| 4,464,543 | 8/1984 | Kline et al. . |
| 4,591,665 | 5/1986 | Foster et al. . |
| 5,337,307 | 8/1994 | Sato et al. .................................. 370/60 |
| 5,506,893 | 4/1996 | Busher et al. . |
| 5,594,904 | 1/1997 | Linnermark et al. ..................... 79/269 |
| 5,659,604 | 8/1997 | Beckmann .............................. 379/220 |
| 5,832,059 | 11/1998 | Aldred et al. ........................... 379/265 |

*Primary Examiner*—Curtis A. Kuntz
*Assistant Examiner*—Rexford N Barnie

[57] ABSTRACT

A method and apparatus using information stored in a communications switch to trace a specific communication in a network, including an in-progress communication. A search request with a set of search criteria is sent to a communications switch that routes communications in the network. Information stored in the communications switch, such as a communications switch call record, is searched to locate information matching the set of search criteria in the search request. The results of the search are reported out of the communications switch allowing the specific communication to be traced.

9 Claims, 3 Drawing Sheets

METHOD AND APPARATUS FOR TRACING A SPECIFIC COMMUNICATION

FIELD OF THE INVENTION

The invention relates to communication networks and more particularly relates to an improved method and apparatus for tracing a specific communication, including an in-progress communication, by searching information stored in a communications switch, such as a communications switch call record.

BACKGROUND OF THE INVENTION

A communication network, such as a switched telephone network, can include a number of interconnected switches that route communications in the network. A call made from one telephone can be routed through several of these switches before reaching the telephone receiving the call. If another call is made between the same two telephones, a different set of switches could be used to route the call.

Communication network users and providers often want to determine exactly which switches and facilities in the network are being used to route a particular communication. Such a capability would trace the path, or route, that a particular communication takes through the network to reveal the origin and destination of that communication, and other pertinent data, such as the specific path that the call utilized.

Knowing which switches and facilities are being used to route a particular call can help a network provider maintain and troubleshoot problems in the network by isolating a particular line or switch that is not functioning as expected. Tracing phone calls can also aid the police or other government authority identify and locate potentially criminal activities.

Another reason for tracing a call is to determine if a call is being received from a particular phone number, even when caller ID is blocked. For example, a network user operating a 1-800 number may wish to keep track of, and reduce, the number of prank phone calls received from the public. A network user might also want to identify the originating location when a caller activates a certain communications service feature, such as the fraudulent entry of a restricted account code, or determine the use of a particular network element such as a particular trunk.

Obviously, in all of the above examples it would be much better to trace a particular communication while the communication is still in-progress. As used herein, the terms "in-progress," "real time" and "interim" in conjunction with a telephone call or associated call record indicate that the associated call has not been terminated, i.e., has not been disconnected. Currently, network users and providers have no easy way to trace the specific route of a particular communication in the network. Instead, tracing is done manually on a switch by switch basis to discover the next switch that sent or received the call. This requires the use of special telecommunications equipment and/or specially trained network provider personnel. The process is time consuming and often cannot trace the route that a particular call takes before the call is terminated.

The method and apparatus disclosed herein takes advantage of the fact that a communications switch stores a variety of information about each call processed by that switch. Existing designs allow a communication switch to include additional information when a signal from, for example, a Network Control Point (NCP) indicates that this should be done for a specific call. This additional information can instruct the communications switch to output the information before the call is terminated. For example, U.S. Pat. No. 5,506,893, issued Apr. 9, 1996, discloses the real time generation of call records in switches for in-progress telephone calls.

In view of the foregoing, it can be appreciated that a substantial need exists for an improved method and apparatus for tracing specific communications using information stored in a communications switch, such as call records.

SUMMARY OF THE INVENTION

The disadvantages of the art are alleviated to a great extent by the method and apparatus using information stored in a communications switch to trace a specific communication in a network, including an in-progress communication. A search request with a set of search criteria is sent to a communications switch in the network. Information in the communications switch is searched to locate information matching the set of search criteria in the search request. The results of the search are reported out of the communications switch.

According to the present invention, network providers and users can enter information to be compared with information stored inside a communications switch, for both currently active calls and calls that have been completed. Information on calls that have characteristics that match the entered set of search criteria is marked for immediate or subsequent special processing according to the desires of the user. Special processing can include formatting the information into a complete or partial call detail record, either immediately or upon a specific event, such as the receipt of answer supervision by the switch. The response to a search can include information that lets a communication be traced toward both the originating and terminating locations using, for example, known trunk information. This capability lets a party trace a particular call while the call is in-progress, based on any information stored in a communications switch. Since call records are typically stored in a switch for some time after call completion, the search can be done even if the call is not answered or after the call is disconnected.

A user could, for example, flag an inappropriate in-progress call that was placed to the a 1-800 number. As explained in detail herein, a search engine could search information stored in one or more communications switches based on information the user knows about the call, such as the incoming trunk. The switch or switches that locate the desired information could automatically respond, providing information letting the user trace the call to the originating location. The call can thus be traced without special telecommunications equipment or specially trained network provider personnel. The process can be automated and the route that a particular call takes can be traced before the call is terminated.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
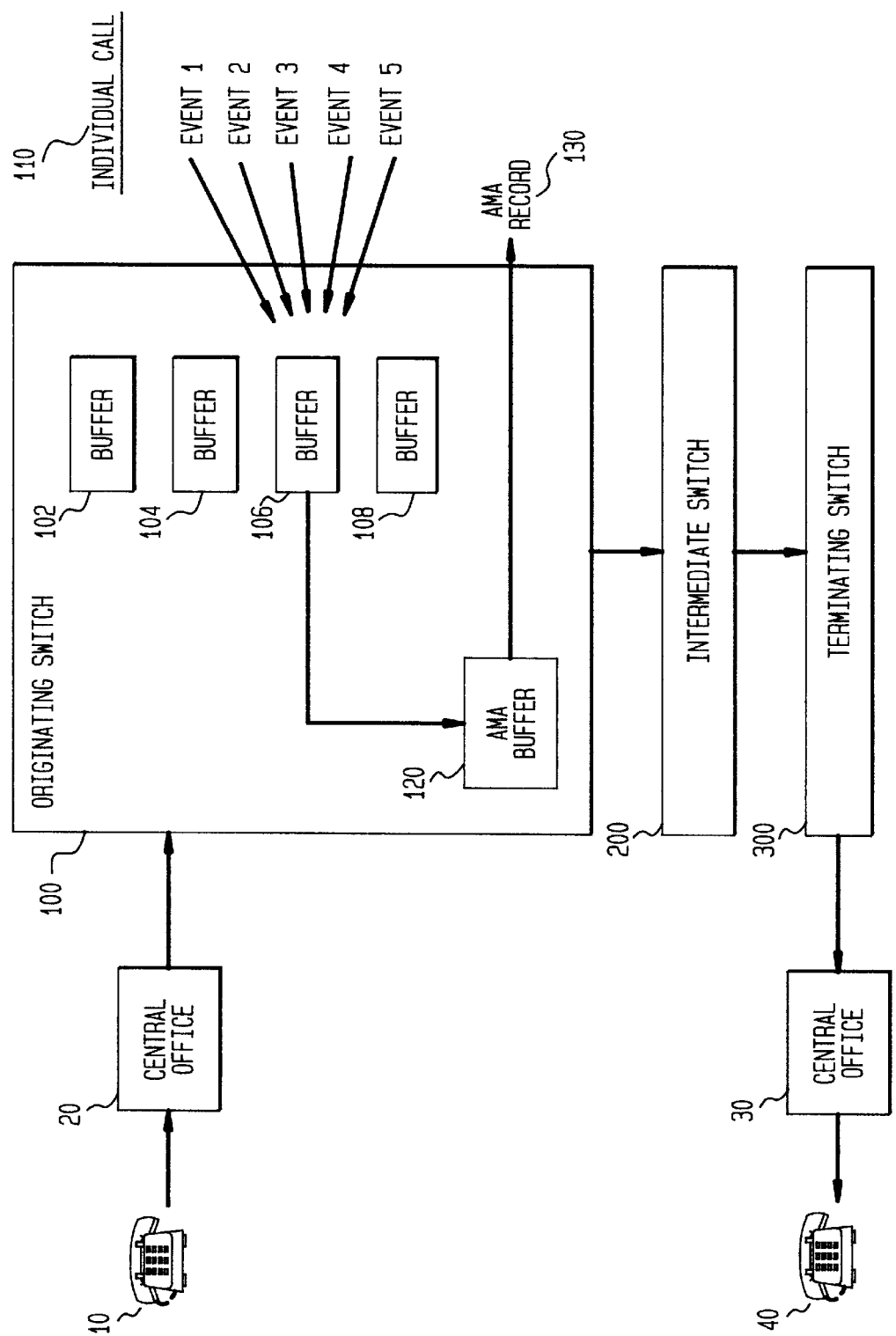
FIG. 1 is a block diagram of a system suitable for practicing an embodiment of the present invention.

The present invention is directed to an improved method and apparatus to trace a specific communication in a network, including an in-progress communication, using information stored in a communications switch. Referring now in detail to the drawings wherein like parts are designated by like reference numerals throughout, there is illustrated in FIG. 1 a block diagram, including elements of a switched telephone network, of a communications network suitable for practicing an embodiment of the present invention.

The communications network shown in FIG. 1 contains a first user station 10, such as a telephone, in communication with a first central office 20. A telephone call made from the first user station 10 to a second user station 40 is routed from the central office 20 to a communications switch 100. The first communications switch to receive the call is referred to as the "originating" switch and the line carrying the call to the originating switch 100 is referred to as the incoming trunk. The originating switch 100 could receive the call directly from a user's premises or from another network provider. The originating switch 100, as well as the other switches discussed herein, can be any switch, including a toll or local switch, such as a No. 4 Electronic Switching System (4ESS) switch available from Lucent Technologies, Inc.

The telephone call is routed through an intermediate switch 200 to a terminating switch 300. Although three switches 100, 200, 300 are shown in FIG. 1, any number of switches could be used to route a telephone call. In some cases only a single communications switch, the originating switch 100, is involved. The call is routed from the terminating switch 300 to the final destination, the second user station 40, through a second central office 30 connected to the terminating switch 300 with an egress trunk.

When a telephone call reaches the originating switch 100, a buffer 106 is assigned to store various information related that particular call. A single switch 100 can have several such buffers 102, 104, 106, 108. The information in the buffer 106 can be used to: control the processing of the call; format the information into an output buffer 120; and generate a call record, such as an Automatic Message Accounting (AMA) record 130 used for billing, when required. As shown in FIG. 1, the information in the buffer 106 is accumulated based on a series of events 110. These events 110 can, among other functions, add data to the buffer 106 or initiate the generation of a call record 130. Typical events 110 during the course of a telephone call include: call origination; the receipt of a message from an associated network database providing routing and billing instructions for the call; the receipt of an address complete message; a signaling message indicating that the intermediate switch 200 has successfully received and processed the signaling information from the originating switch 100; a signaling message indicating that the second user station 40 has answered the call; and a signaling message indicating that the second user station 40 has terminated the call. Each call generates only the events 110 appropriate to the circumstances of the call. For example, a call that was not answered would not receive the event indicating answer.

The buffer 106 is normally cleared and made available for another call when the current call is terminated. For a completed call, this occurs when the first and second user stations 10, 40 disconnect. A variety of circumstances cause call termination for incomplete calls, for example: busy, no answer and network congestion. Switch administration functions (not shown in FIG. 1) determine if an AMA record 103 will be made for a given call. The decision to make an AMA record 130 can depend on, for example, the trunk group on which the call reached the switch 100, the type of the call (a POTS call or Intelligent Network call, for example), or other factors. It is common to administer the switches so that an AMA record 130 is made, if one is made at all, only at the originating switch 100. Under certain circumstances, an AMA record 130 is made at a time other than call termination. For long duration calls it is common to generate an AMA record 130 periodically so that the recording and billing of the call does not wait until call termination. These long duration calls, such as data calls, can be active for periods in excess of a month.

Figure 2:
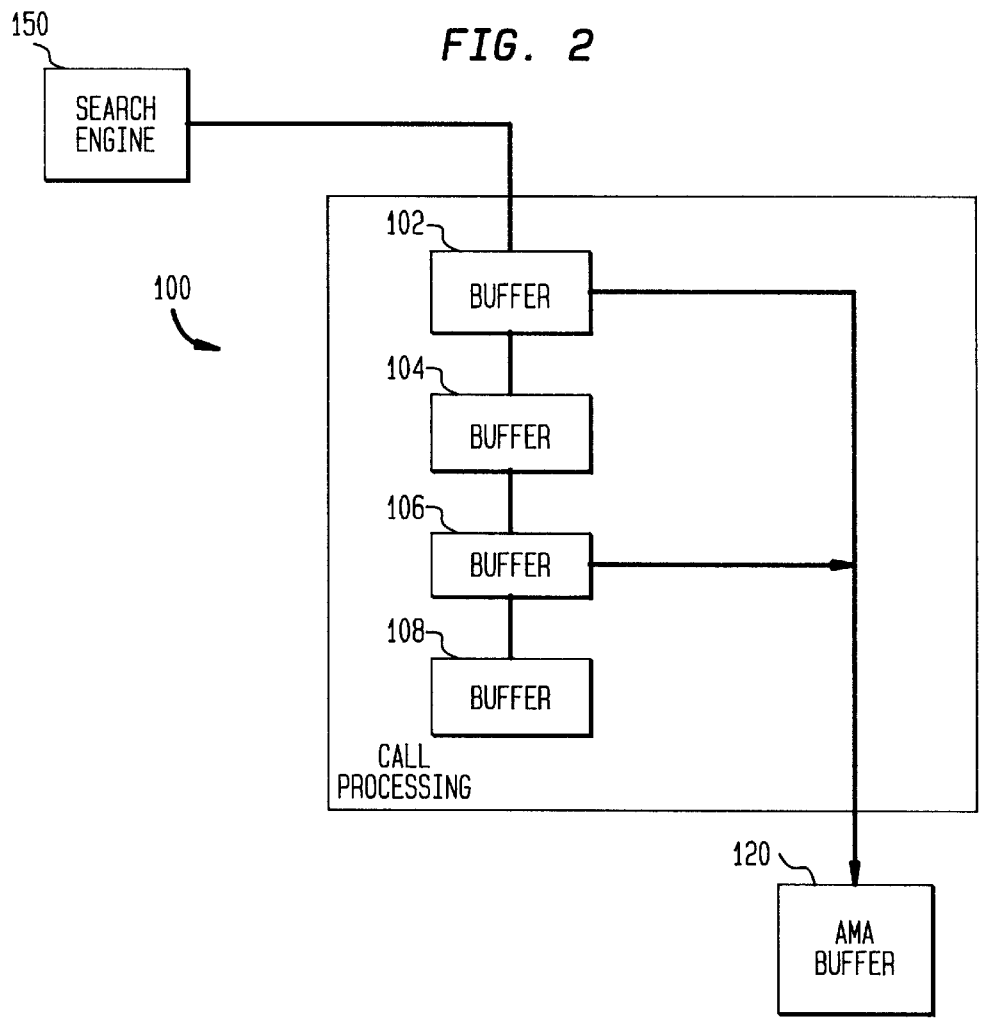
FIG. 2 is a block diagram of communications switch call processing according to an embodiment of the present invention.

FIG. 2 is a block diagram of communications switch call processing according to an embodiment of the present invention. A search engine 150 is added to the data buffers 102, 104, 106, 108 in the communications switch 100. The search engine 150 can be used to make information in a buffer available in real time for selected calls. Although a single switch 100 can contain a number of search engines 150, each search engine 150 has a separate trigger mechanism to determine when the search engine 150 is applied. Each search engine 150 also has a set of search criteria, for example a list of originating telephone numbers. The contents of a buffer are formatted and output from the communications switch 100 when information in that buffer matches the set of search criteria. A search engine 150 can direct the output of a search to a specific destination and can search for information related to in-progress or completed calls using data stored in the switch 100, such as an AMA record.

A variety of trigger mechanisms can be utilized depending on the function of the search engine 150. For example, a search engine 150 could be created in immediate response to a command entered from a switch maintenance console (not shown in FIG. 2). This would provide immediate data on a call currently in-progress for diagnostic or other reasons as described above. The mechanism required to perform the search can be resident in the communications switch 100 or downloaded from an external source.

A search engine 150 could also be generated in response to a command automatically created by the output of a search engine in another switch. The set of search criteria for the search engine 150 would be based on the output generated from the previous switch, letting the two searches identify information in the two switches corresponding to the same call. Such a mechanism could be used in call tracing as described with respect to FIGS. 3 and 4.

Figure 3:
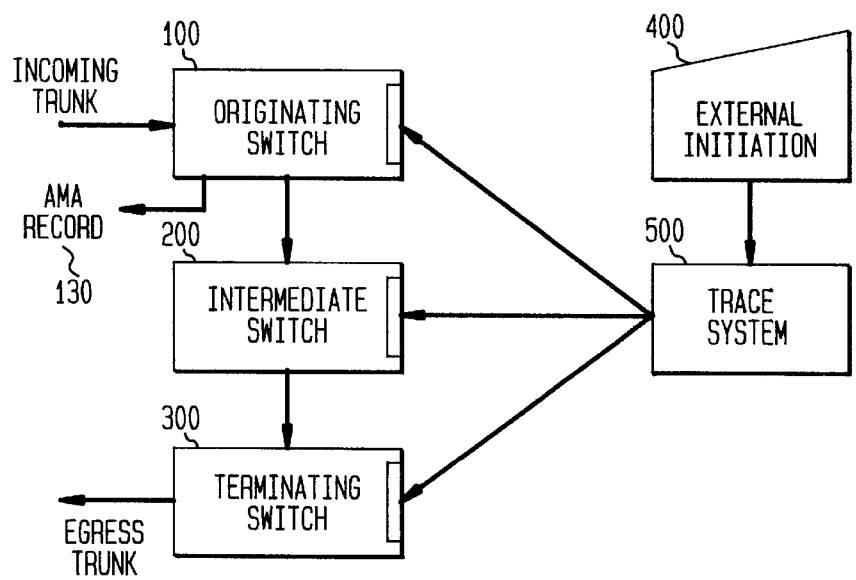
FIG. 3 is a block diagram of the external initiation of call tracing according to an embodiment of the present invention.

FIG. 3 is a block diagram of the external initiation of call tracing according to an embodiment of the present invention. Upon entry of an external trace request 400, a trace system 500 sends a command to the originating switch 100 creating a search engine with the entered set of search criteria. If the originating switch 100 is unknown, the trace system 500 can create search engines in each of the switches 100, 200, 300 and receive a number of responses corresponding to candidate calls. After the trace system 500 selects the call that corresponds to the trace request 400, another search request is formulated to locate data from the next switch 200.

The purpose of the trace system 500 is to identify all the switches 100, 200, 300 that route a particular call and collect the information that was requested. For example, the terminating switch 300 normally knows the egress trunk, or specific trunk used to complete the call to the customer premises or to another network. This information is not commonly available at the originating switch 100. Similarly, the originating switch has information about the incoming trunk. Depending on the requested information, the trace system 500 can move from switch to switch until the originating switch 100 or terminating switch 300 is located and output the requested information.

Figure 4:
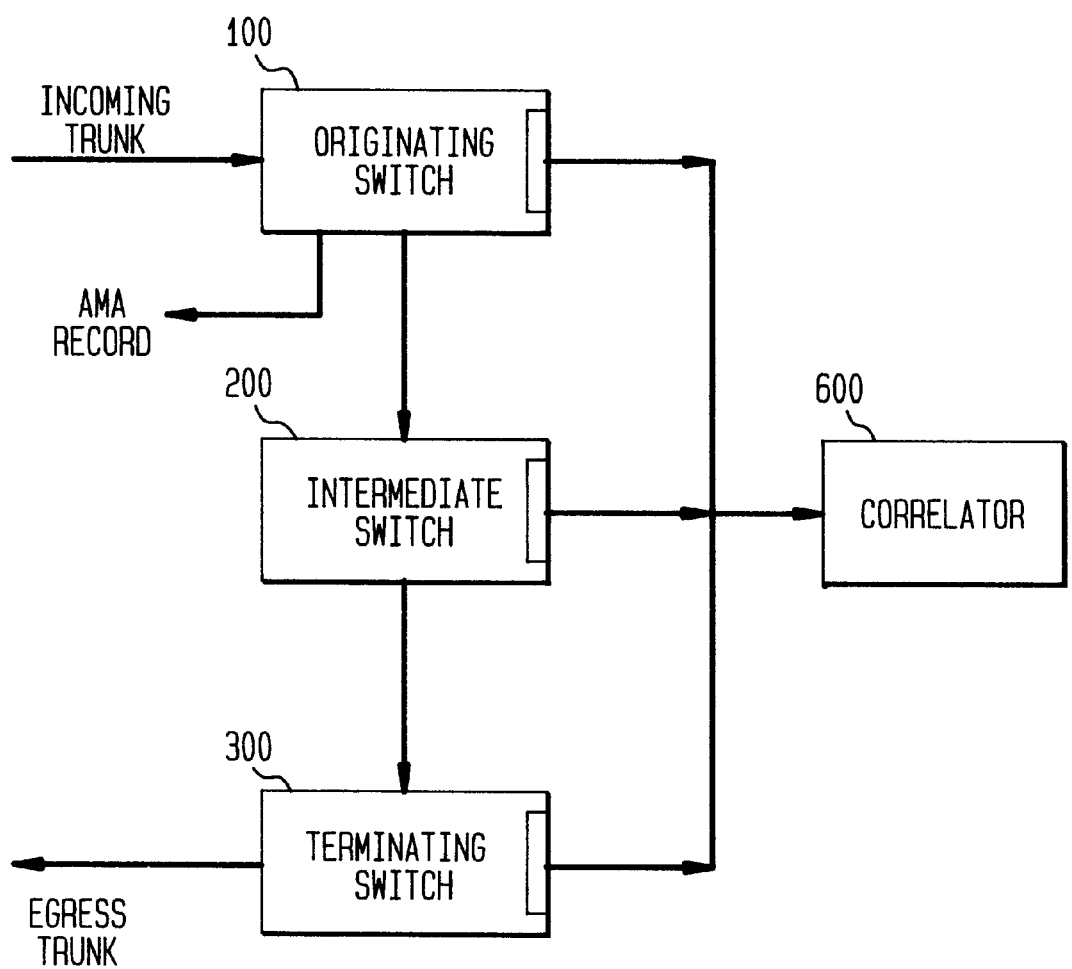
FIG. 4 is a block diagram of the correlation of search results according to an embodiment of the present invention.

FIG. 4 is a block diagram of the correlation of search results according to an embodiment of the present invention. Depending on the specific buffers used in the switches, and on the characteristics of the signaling system used to send information between the switches, it may be possible to use a single search query for all switches. If so, the single query can be broadcast to all of the switches in the network. Each switch 100, 200, 300 through which the call is routed would generate a response to the broadcast. In this case, the trace system would not have to reformulate the query for each switch and a correlator 600 could be used to obtain the requested information.

Such a correlator 600 could be used, for example, to provide autonomous customer network management reports. A search engine can be established in each switch in the network, and a trigger mechanism can be chosen based on an appropriate event, or set of events. When the information requested by the customer is stored in a switch buffer an autonomous report process is initiated. The search engines identify the buffers in each of the switches 100, 200, 300 through which the call passes and send the information to a correlator 600, which correlates the data from each of the switches 100, 200, 300 into a single record containing details of the call as requested by the customer. The record could, for example, contain both the originating trunk into the originating switch 100, and the terminating trunk egressing from the terminating switch 300.

The correlation of data from different switches can be simplified by associating, in the originating switch 100, an identification number that identifies the call uniquely during the time the call is active. Such an identification number can be constructed from a number that identifies the switch 100 concatenated with a number that identifies the buffer associated with the call, and, if desired, can also include the date and time associated with the call. The identifier number can be included in the buffer of the originating switch 100 and provided as output from the search engine. In addition, the identifier number can be passed through the signaling network to the next switch 200, which would also store the identifier number in a buffer. The intermediate switch 200 would pass the same identifier number received from the originating switch 100 to the subsequent switch 300 making the identifier number available at each switch that routed a particular call. The actual format of the identifier number can be selected based on the types of searches and tracing to be performed. For example, the identifier number might indicate the next switch to which the call is routed, or identify the type of call, for example an Intelligent Network (IN) call. Each switch 100, 200, 300 can generate its own identifier number and store the identifier number received from the last switch as well as the call identifier number of the current switch.

Although various embodiments are specifically illustrated and described herein, it will be appreciated that modifications and variations of the present invention are covered by the above teachings and within the purview of the appended claims without departing from the spirit and intended scope of the invention. For example, although only a simple trace system and correlator are given as examples of the usefulness of a search engine, it can be appreciated that more sophisticated systems can be utilized instead and still fall within the scope of the invention.

What is claimed is:

1. A method of tracing the route of an in-progress call in a public switched telephone network having a communications switch with buffers storing information about calls in the network, comprising the steps of:

sending a set of search criteria related to the in-progress call to the communications switch;

searching information in the communications switch buffers to locate information related to the in-progress call; and reporting the results of the search, including results that allow the route of the in-progress call to be traced, out of the communications switch while the call is still in-progress.

2. The method of claim 1 wherein the information stored in the communications switch buffers would not otherwise be output from the communications switch.

3. The method of claim 2 wherein said step of reporting is performed by the communications switch reporting call record data related to the in-progress call.

4. The method of claim 1, wherein the in-progress call is traced to an originating communications switch.

5. The method of claim 1, wherein the in-progress call is traced to a terminating communications switch.

6. The method of claim 1, wherein the search request is sent to a plurality of communications switches in the network.

7. The method of claim 6, further comprising the step of:

correlating the results of the searches reported from the plurality of switches.

8. The method of claim 1, further comprising the steps of:

sending a second set of search criteria related to the in-progress call based on the results reported from the search, to a second communications switch;

performing a second search for information in the second communications switch buffers to locate information matching the second set of search criteria; and reporting the results of the second search from the second communications switch to allow the in-progress call to be traced.

9. The method of claim 1 wherein the set of search criteria contains an identifier number associated with an information buffer used to store events related to the in-progress call.

* * * * *